United States Patent [19]

McLaren

[11] Patent Number: 5,311,388
[45] Date of Patent: May 10, 1994

[54] COMPOSITE TAPE CASSETTE

[76] Inventor: Edwin C. McLaren, 9868 Ford Rd., Perrysburg, Ohio 43551

[21] Appl. No.: 897,233

[22] Filed: Jun. 11, 1992

[51] Int. Cl.⁵ .............................................. G11B 23/02
[52] U.S. Cl. .................................... 360/132; 242/199; 206/387
[58] Field of Search ................ 360/132, 137; 242/199; 206/387, 389

[56] References Cited

U.S. PATENT DOCUMENTS

| | | | |
|---|---|---|---|
| 4,352,578 | 10/1982 | Dunning et al. | 400/208 |
| 4,453,683 | 6/1984 | Reimer et al. | 242/199 |
| 4,883,176 | 11/1989 | Hart et al. | 206/387 |
| 4,891,712 | 1/1990 | Spitzer et al. | 358/335 |
| 4,969,612 | 11/1990 | Thomas | 242/199 |
| 4,978,009 | 12/1993 | Pany | 206/620 |
| 5,103,978 | 4/1992 | Secor | 206/387 |

OTHER PUBLICATIONS

"Tape/Disc Buisness", vol. 4, No. 12, Dec. 1990, Genesis, Knowledge Industry Publications-1 page.

Primary Examiner—John H. Wolff
Attorney, Agent, or Firm—Emch, Schaffer, Schaub & Porcello Co.

[57] ABSTRACT

A composite tape cassette, for use in either video or audio format is disclosed. The tape cassette includes a lightweight rigid thermoplastic frame for carrying the reels and tape and providing structural rigidity to the cassette. The frame is encompassed by a paperboard sheath which is securely bonded thereto. Graphics for the cassette are carried directly on the sheath.

17 Claims, 8 Drawing Sheets

COMPOSITE TAPE CASSETTE

BACKGROUND OF THE INVENTION

The invention relates to an improved tape cassette intended for use with video or audio technology. Specifically, the invention provides a tape cassette intended to be primarily utilized in the duplicator market. Duplicators commonly are independent companies serving the video and audio tape markets. For instance, the video market is primarily composed of three distinct categories: (1) the movie retail and rental market; (2) the industrial market consisting of 12-30 minute tapes such as demo tapes, catalogue tapes, plant tours, etc; and (3) the premium incentive market, generally consisting of classic movies or other tapes sold as a premium with the purchase of another product. The audio market is also composed of three distinct categories: (1) the music market; (2) the spoken word retail and rental market; and (3) the instructional retail and rental market. Duplicator companies are used to supply all of these markets. Such tapes, in the video industry alone, are estimated to account for over one billion prerecorded video cassettes that were dubbed and distributed in 1990.

Duplicator operations are, overall, fairly similar. The video duplicator purchases a "standard" all plastic video cassette, called a shell, having a small leader tape inside. Video tape copies are made from an original tape and then loaded into the shells. The industry "standard" and most commonly available video cassette is heavily built and usually designed for long playing tape—typically two to six hours. The industry "standard" cassette is primarily constructed from all black plastic, with graphics applied through the use of a label, having a tuck-in style outer carton which has an open end on either the bottom or the side into which the video cassette is inserted. Less commonly available are other assorted all plastic cassettes, such as a one-piece clamshell cassette and the "Delta" cassette, which are constructed with lighter-weight components than the industry "standard" cassette. Audio cassettes generally use an all plastic cassette having graphics applied through the use of a label and a graphic paperboard insert usually placed inside a clear plastic flip-top storage box.

The use of such standard cassettes in the duplicator market provides for an end quality which is sometimes much greater than that necessary for the intended life span of the tape contained therein. As a result, there is a demand for less expensive cassettes offering limited play quality. Cassette designers, primarily those in the video industry, have attempted to meet this demand and provide a lower cost cassette better suited for use in the duplicator industry. Examples of such cassettes are shown, for instance, in U.S. Pat. No. 4,969,612 which discloses a cassette having top, bottom and side panels which are made of a bendable material such as paperboard, and U.S. Pat. No. 4,883,176 which discloses a paperboard video cassette housing. Such an all paperboard cassette, however, has been found to lack sufficient strength to operate in a commercial video cassette player and, many times, self destructs during initial use. Therefore, there remains a demand for a cassette tape, both audio and video, that is better suited for use in the duplicator market than the standard all-plastic cassettes currently available.

It is an object of this invention to provide a tape cassette which is lightweight and offers the limited play quality for the intended useful life span of the unit.

Another object of this invention is to reduce the per unit cost of a tape cassette.

A further object of this invention is to provide a tape cassette having a lower per unit postage cost for mailing and shipping than the industry "standard" cassette.

Another object of this invention is to provide a lightweight and less expensive tape cassette by reducing the amount of plastic required in the structure of the cassette.

Yet another object of the invention is to provide a tape cassette that eliminates the need for the outer carton.

Yet a further object of the invention is to provide the capability for applying high quality graphics directly to the tape cassette, thus further eliminating the need for the outer carton.

A further object of the present invention is to provide tape cassette graphics, applied directly to the tape cassette, that have a print/gloss quality comparable to that of a vinyl album jacket.

Yet another objective of the present invention is to provide a tape cassette that discourages illegal duplication. Currently, illegal duplication of tape cassettes is easily accomplished because of the industry use of the "standard" style cassette which is available from numerous sources. Counterfeiters only need to load the duplicated tape into the standard shell and duplicate the label to achieve an end product virtually identical with the legal originals and duplicates. If the counterfeit is given good graphics duplication which is commonly available, it is very difficult to identify an original tape cassette from an illegal duplicate. The present invention is intended to provide a unique tape cassette which will assist in preventing illegal duplication because it is not "standard" and would be cost prohibitive to manufacture and duplicate.

These objects and others are achieved by the present invention can be readily understood upon analysis of the following detailed description of the preferred embodiments with reference to the accompanying drawings.

SUMMARY OF THE INVENTION

This invention achieves the above-noted objectives by providing a tape cassette, either audio or video, which is composed of a lightweight plastic frame having structural integration with a paperboard sheath. The plastic frame is provided to enhance the structural integrity of the cassette and to provide durability to all major points of contact between the cassette and the tape playback unit. However, all surfaces of the cassette where plastic structure is unnecessary for the structural integrity and strength of the cassette, the plastic is either reduced in thickness or eliminated altogether and the affected surface of the cassette is covered with a paperboard sheath which provides a lighter weight material for the cassette construction. The use of the paperboard sheath further provides the ability to apply overall graphics directly onto the cassette thereby creating an attractive and marketable cassette shell. The unit cost of each cassette constructed in accordance with this invention is reduced by limiting the amount of plastic used in the construction of the cassette and further reduced by eliminating the need of the outer carton with graphics or plastic flip-top box with graphics currently utilized to store tape cassettes. The present invention, incorporating the plastic frame and paperboard structure with graphics preapplied, provides a strong, lightweight tape cassette having overall graphic capability. The composite audio tape cassette further provides a tamper-evident protective cover for the tape by sealing the tape gate, during distribution, with a protective clip or cover designed to be removed prior to inserting the audio cassette into the playback unit.

The combination paperboard plastic structure of the present invention utilizes the standard tape and spool mechanism common to the industry. The use of plastic provides for structural integrity at all potential or direct wear areas, as well as all points of contact with the tape and the playback unit. The paperboard overlay is bonded directly to the plastic frame to produce a strong lightweight structure.

DETAILED DESCRIPTION OF THE PREFERRED EMBODIMENT

The present invention provides a composite tape cassette, preferably composed of a plastic frame having a paperboard shell or sheath bonded or welded thereto. The plastic frame is designed to enhance the structural integrity of all areas of the cassette which contact the tape playback and/or recorder unit, the tape and reels, and other areas of the cassette subject to wear and tear, such as the corners. The tape cassette of the present invention is intended for use in either video or audio format; the features of the invention remain the same.

Referring now to FIGS. 1-8, a tape cassette intended for use as a video cassette is shown in detail. The tape cassette shown is designed to fit standard VHS format, however, it should be understood that video tape cassettes of any format can be made a subject of the present invention. The video tape cassette shown in FIGS. 1-8 includes a frame member 10, preferably composed of a durable lightweight thermoplastic material. The frame member 10 is encased by a lightweight flexible sheath 12, preferably composed of paperboard, which is bonded to the frame member 10 to form the cassette shown in FIG. 2.

Referring now to FIGS. 1 and 4-8, the frame member 10 of the video cassette of the present invention is constructed to have the standard outside dimensions designed for use in a standard VHS playback and recording machine. The thermoplastic frame member 10 includes open cut-out areas 14 located in the top surface 16 and bottom surface 18 of the frame member 10. The cut-out areas 14 are designed to eliminate as much thermoplastic material from the tape cassette as possible, without negatively affecting the structural rigidity of the frame member 10 and the structural support for the tape reels 20. As can be seen from the figures, the tape reels 20 are supported by thermoplastic cross members 22 extending perpendicularly through the cut-out areas 14. The frame member 10 is provided with two distinct thicknesses. The protective tape gate area 24, corners 26, and bottom edges 28 are designed to have a thickness of thermoplastic material that is comparable to that found in the "standard" commercial VHS cassette. The thermoplastic material of the remaining frame structure is designed to be about 0.014 to 0.018 mils thinner. The protective tape gate 24, corners 26 and bottom edges 28, are designed to have the thicker structure in order to provide the necessary strength, integrity and durability to the frame member 10. Preferably the difference in thickness between the protective tape gate 24, corners 26, bottom edges 28, and the remainder of the frame is equivalent to the thickness of the sheath 12 which is designed to encompass the frame member 10 and bond to the thinner plastic area surrounded by the protective tape gate 24, corners 26, and bottom edges 28. Thus, after the sheath 12 is bonded to the frame member 10, there will be no exposed edges of the sheath 12 which could be subject to damage.

Located about the periphery of the thin portion of the frame member 10, on all sides of the cassette, are upraised energy director beads 29 which are formed from the same thermoplastic material as the frame member 10. The energy director beads 29 are utilized to bond the paperboard sheath member 12 to the frame member 10. The sheath member 12 is, preferably, coated on its interior surface with a styrene film or other product known to be compatible with the thermoplastic material of the energy bead 29. In production, the sheath member 12 is positioned over the frame member 10 and ultrasonic vibrations are applied to the composite frame member 10 and sheath member 12. The ultrasonic vibrations "melt" the energy beads 29 and causes their material to blend with the styrene coating, thus welding the sheath member 12 to the frame member 10 as the molten blend solidifies. Of course, other methods of bonding, such as adhesives and hot melt gluing, may be used in place of energy director beads 29 and the ultrasonic weld technique. It should also be noted that the styrene coating serves a secondary purpose of providing a moisture vapor transmission barrier, thereby assisting in maintaining the integrity of the sheath member 12.

Figure 1:
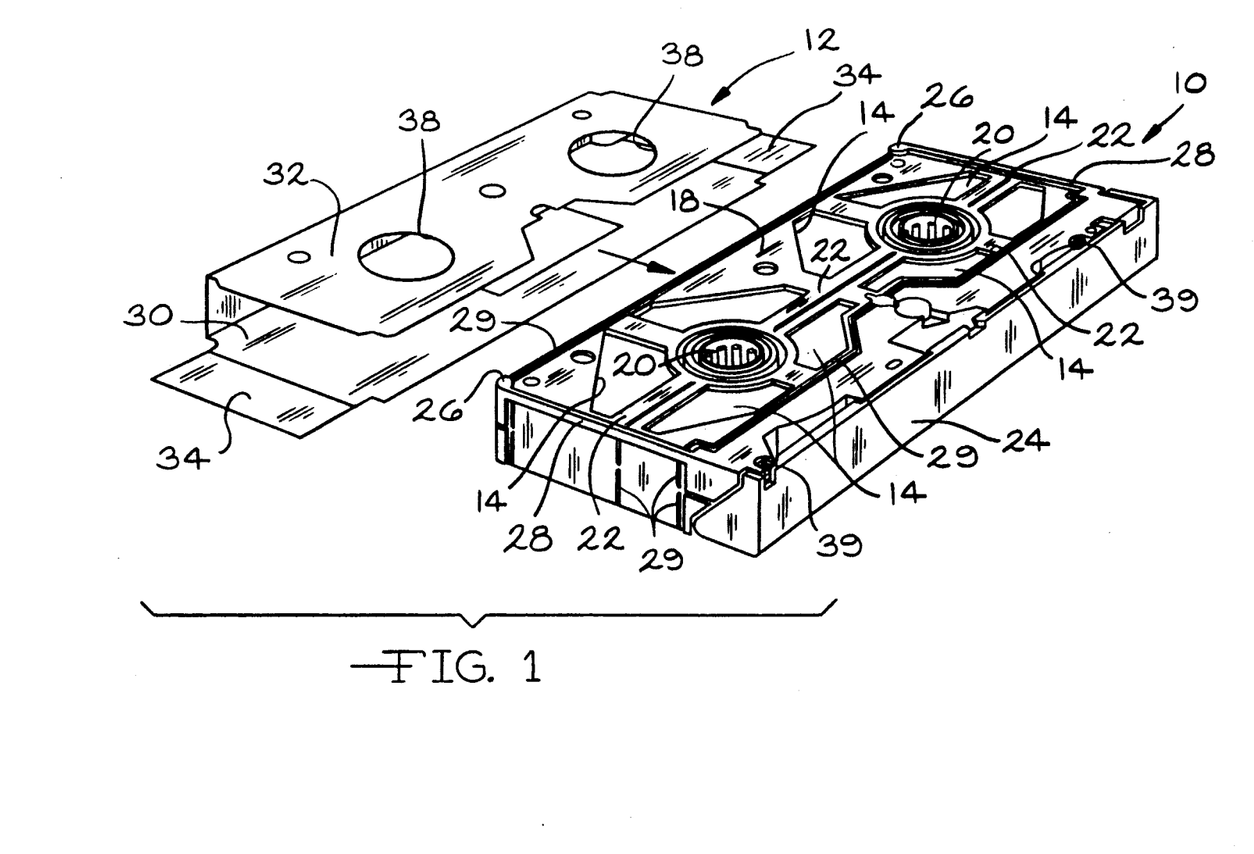
FIG. 1 is an exploded perspective view showing a tape cassette of the present invention, in video format with the plastic frame separated from the paperboard sheath.
Figure 2:
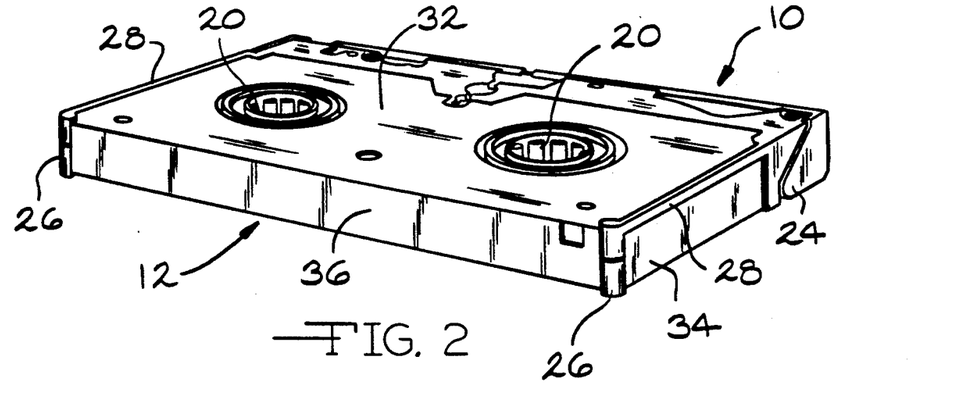
FIG. 2 is a perspective view of the tape cassette of FIG. 1 with the paperboard sheath bonded to the plastic frame.
Figure 3:
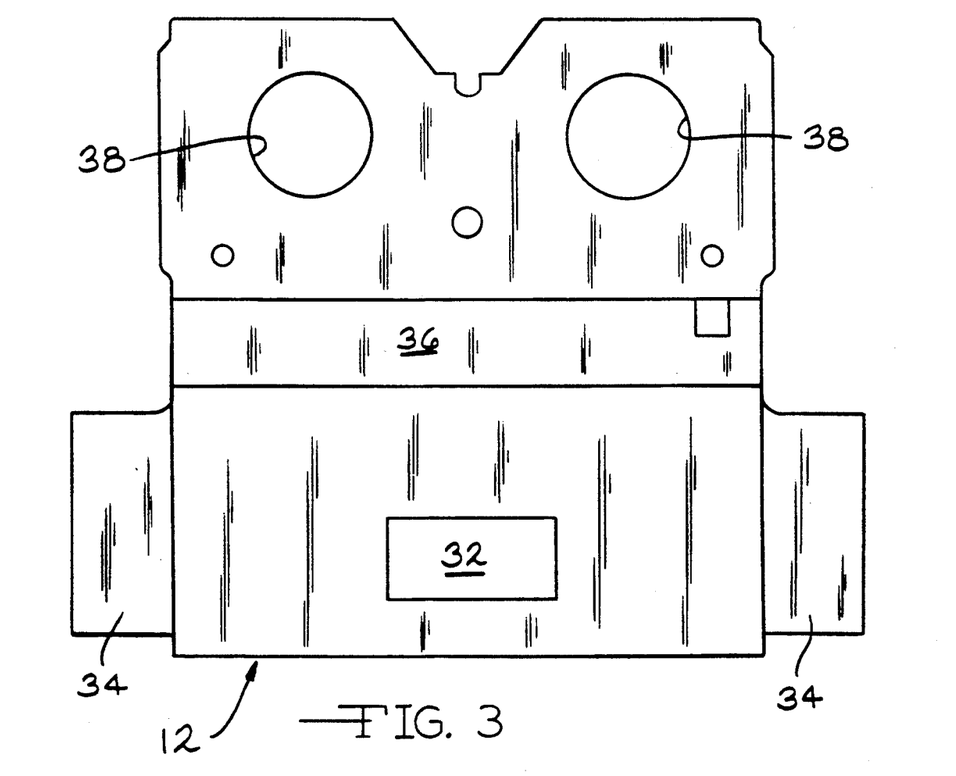
FIG. 3 is a pattern layout of the paperboard sheath as used with the tape cassette of FIG. 1.
Figure 4:
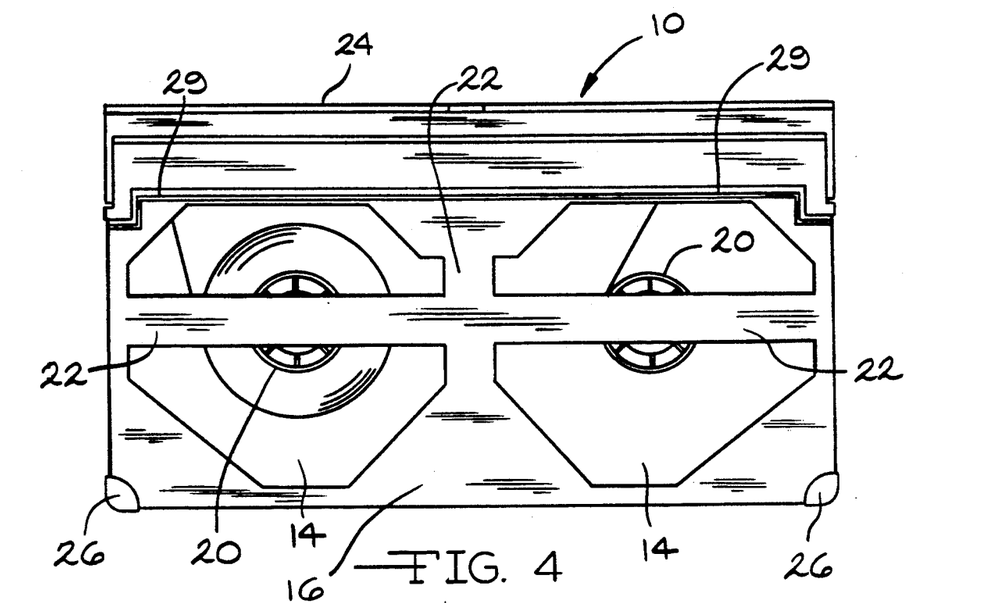
FIG. 4 is a top view of the plastic frame of the tape cassette of FIG. 1.
Figure 5:
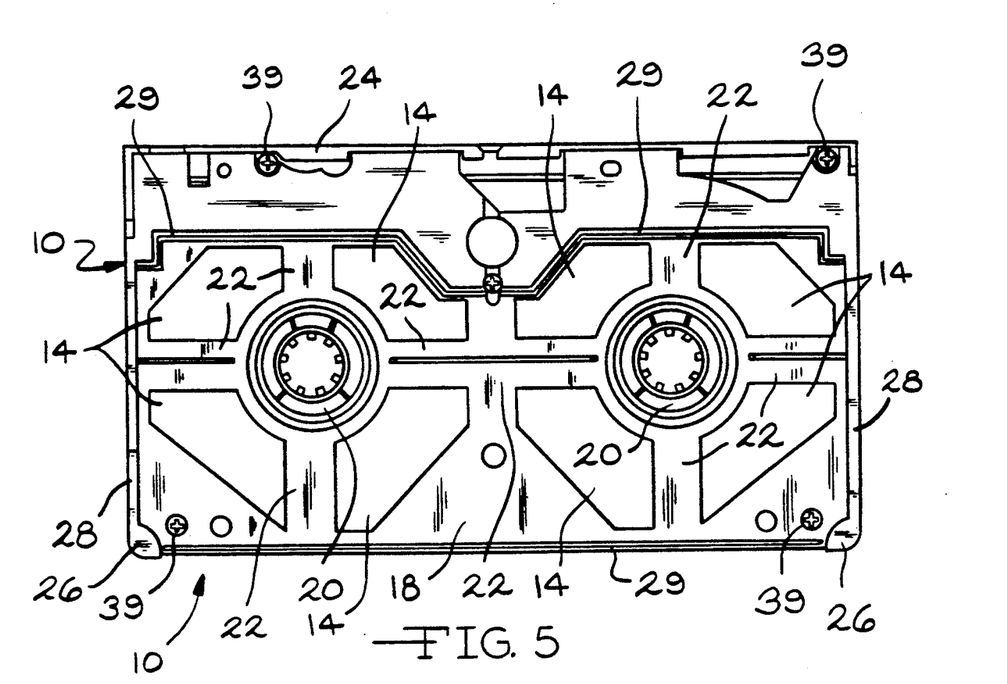
FIG. 5 is a bottom view of the plastic frame of the tape cassette of FIG. 1.
Figure 6:
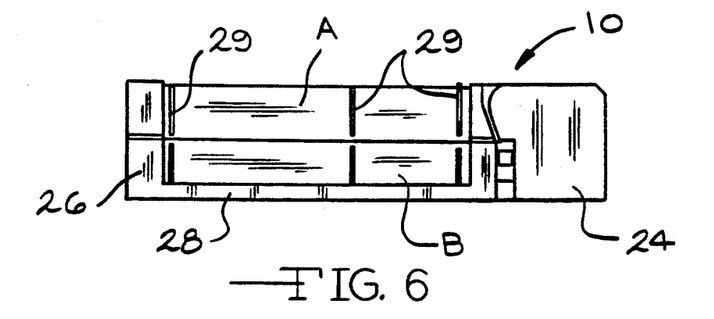
FIG. 6 is an end view of the plastic frame of the tape cassette of FIG. 1.
Figure 7:
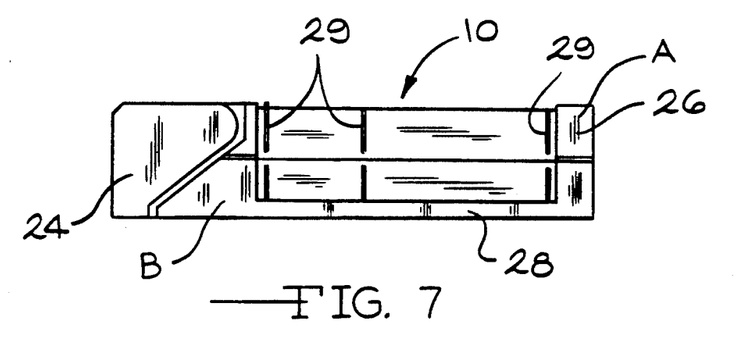
FIG. 7 is an opposed end view of the plastic frame of the tape cassette of FIG. 1.
Figure 8:
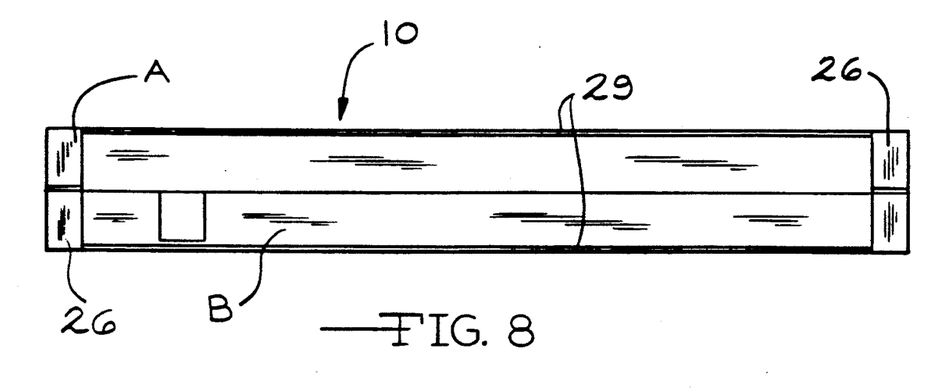
FIG. 8 is a back view of the plastic frame of the tape cassette of FIG. 1.
Figure 9:
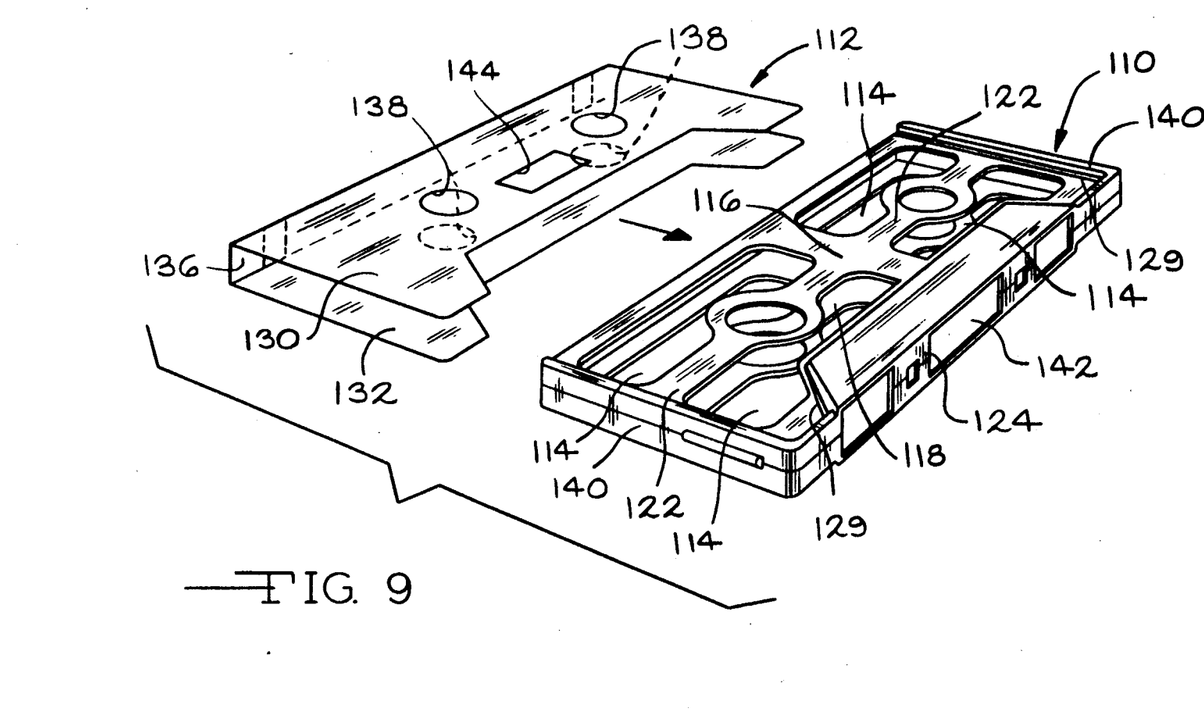
FIG. 9 is an exploded perspective view showing a tape cassette of the present invention, in audio format, with the plastic frame separated from the paperboard sheath.
Figure 10:
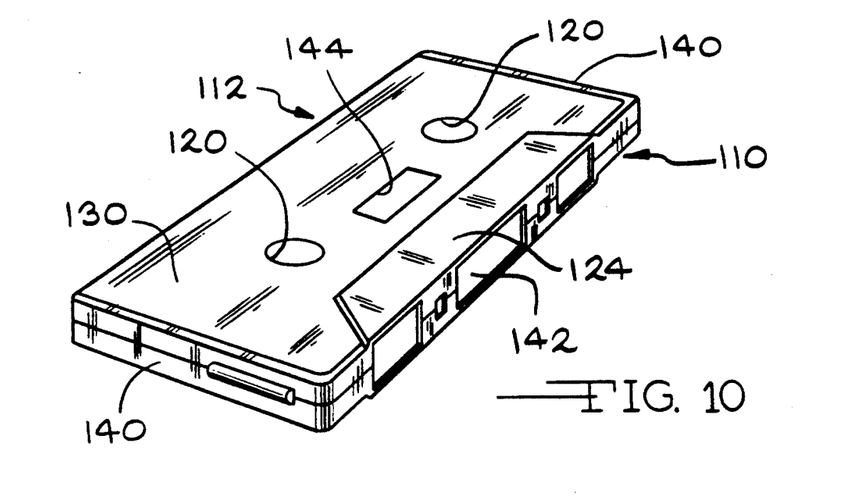
FIG. 10 is a perspective view of the tape cassette of FIG. 9 with the paperboard sheath bonded to the plastic frame.

Referring now to FIGS. 1, 2 and 3, the sheath 12 of the present invention includes a top flap 30, bottom flap 32, end flaps 34, and back flap 36. The sheath 12 is patterned to fit on the thin portion of the plastic frame 10, within the edges provided by the protective tape gate 24, corners 26 and top edges 28 of the frame member 10. The bottom flap 32 includes holes 38 to allow access to the reels 20 and the top flap 30 is, preferably, composed of solid material. Graphics may be applied to the exterior surface of the paperboard sheath 12 shown in FIG. 3 prior to application and bonding of the sheath member 12 to the frame member 10. Thus, after application and bonding of the sheath member 12 to the frame member 10 as shown in FIG. 2, a composite tape cassette having applied graphics is provided.

It should be noted that the construction of the frame member 10 usually includes a top half A and a bottom half B which are separated to insert the reels 20 and tape (not shown). In the embodiment shown in the Figures, the two halves A and B are fastened together by screws 39. However in the preferred embodiment of the present invention, the top half A and bottom half B can be designed to include a post and hole friction fit, snap-fit, or any other means of joinder without the need for loose parts, which can be reinforced by the bonding of the sheath member 12 to the frame member 10. This elimination of the need for loose parts such as screws serves to eliminate the cost of the parts, the assembly time required to utilize the parts, as well as eliminate the weight of the screws and further, to hinder the potential for tampering with the tape cassette after manufacture.

Referring to FIGS. 9-17, the tape cassette of the present invention is shown in its preferred embodiment for audio tape cassette use. The structure of the audio tape cassette features the same advantages as the video tape cassette referred to in FIGS. 1-8. Referring now to FIGS. 9-14, the frame member 110 of the audio tape cassette is shown with cut-out areas 114 surrounding the reels 120. Cross members 122 support the reels 120 and provide structural rigidity to the frame member 110. All areas of the frame member 110 are of a thin cross section with the exception of the ends 140 and the tape feed area 142. The cassette ends 140 and tape feed area 142 are provided with a thicker material to provide structural rigidity and durability to the tape cassette. The difference in thickness, preferably, between the cassette ends 140, tape feed area 142 and the remaining portion of the frame member 110 is the thickness of the sheath member 112, approximately 0.014 to 0.018 mils. A line of energy director beads 129 are provided proximate the cassette ends 140 and tape feed area 142. The energy director beads 129 are used in the process of ultrasonic welding and bonding of the sheath 112 to the frame member 110, as described earlier with regard to the video tape embodiment. As with the video tape embodiment, other methods of adhering the sheath member 112 to the frame member 110 may be used.

Figure 11:
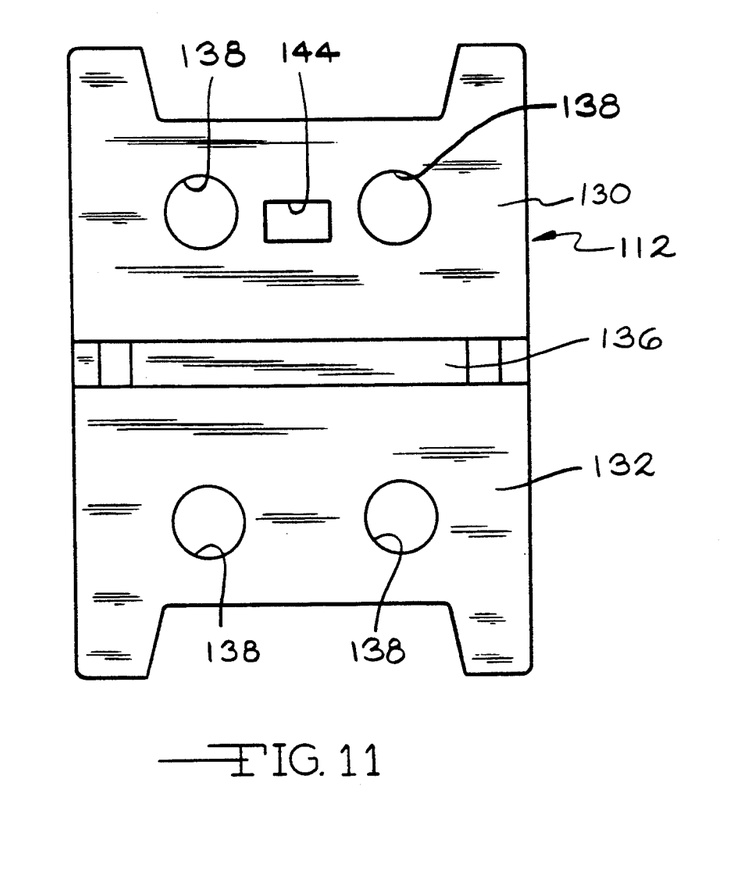
FIG. 11 is a pattern layout of the paperboard sheath as used with the tape cassette of FIG. 9.
Figure 12:
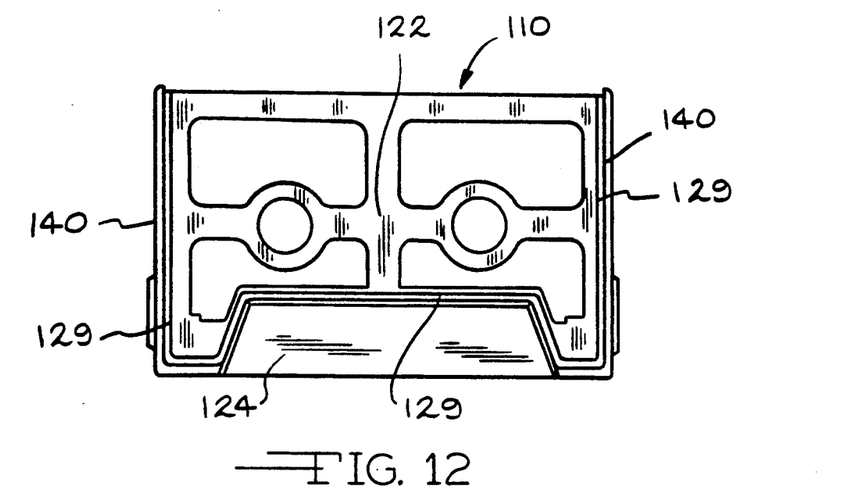
FIG. 12 is a top view of the plastic frame of the tape cassette of FIG. 9.
Figure 13:
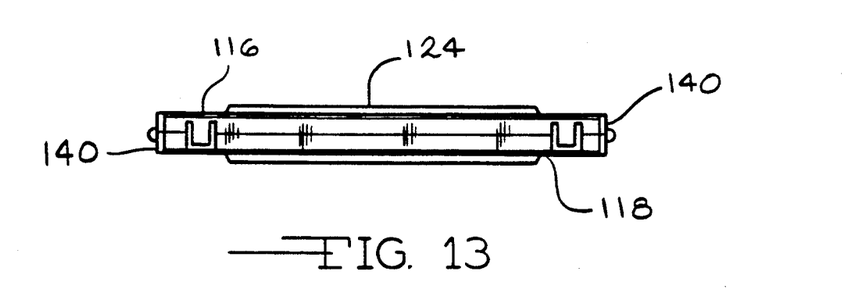
FIG. 13 is a back view of the plastic frame of the tape cassette of FIG. 9.
Figure 14:
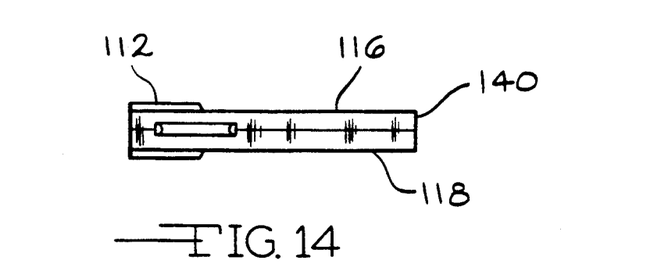
FIG. 14 is an end view of the plastic frame of the tape cassette of FIG. 9.

As shown in FIG. 11, the sheath 112 includes a top flap 130, bottom flap 132, and back flap 136. The top flap 130 and bottom flap 132 include holes 138 designed to provide access to the reels 120 of the cassette. Optionally, a window 144 may also be provided in the top flap 130 to assist in viewing the tape during running conditions. As in the video cassette version of the present invention, the frame member 110 is provided with a top half AA and a bottom half BB. The two halves are preferably friction fit together and sealed by the bonded sheath member 12, thus eliminating the need for screws to hold the halves together, for the same reasons earlier described with regard to the video cassette.

Figure 15:
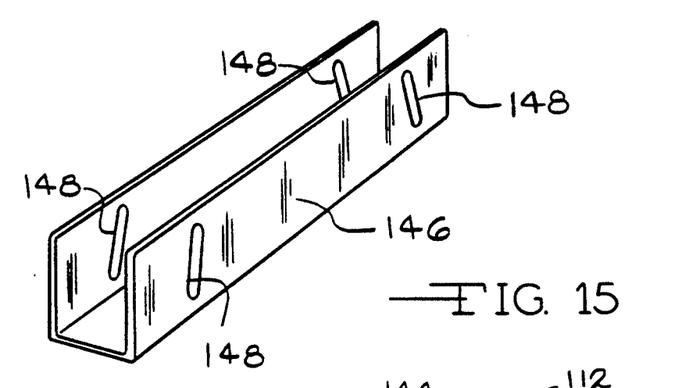
FIG. 15 is a view of the protective tape gate clip intended for use with the tape cassette of FIG. 9.
Figure 16:
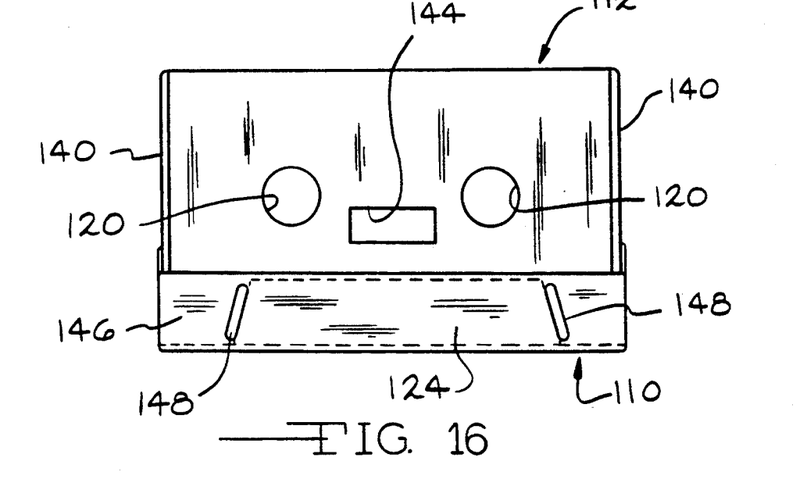
FIG. 16 is a top view of the tape cassette of FIG. 9 with the clip of FIG. 15 attached thereto.
Figure 17:
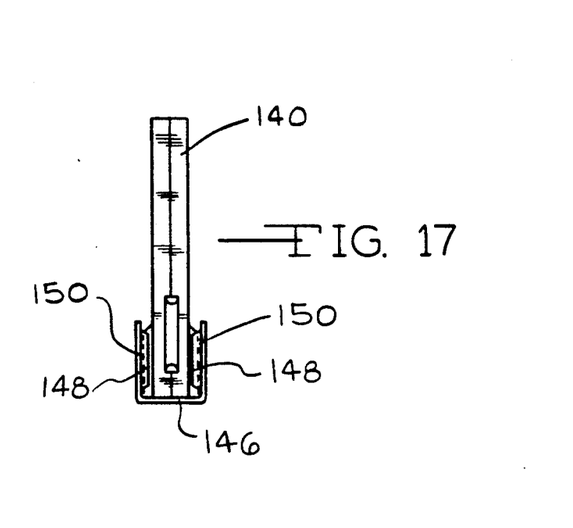
FIG. 17 is an end view of the tape cassette of FIG. 9 with the clip of FIG. 15 attached thereto.

Referring now to FIGS. 15-17, the audio tape cassette constructed in accordance with the present invention usually is designed to have a tape feed area 142 that is open and accessible to infiltration by dirt or other foreign objects when not in use. To prevent damage to the tape from such foreign objects and dirt, a clip member 146 is designed to attache to the cassette and cover the tape feed area 142 in a protective manner. The clip member 146 is also designed to provide stability to the cassette so that it can stand upright, horizontally or vertically. The clip member 146 is generally constructed of plastic and includes inwardly projecting extrusions 148 designed to mate with indentations 150 located in the frame member 110. The mating of the extrusions 148 with the indentations 150 retain the protective clip member 146 in position. An alternative, embodiment for the clip member 146, not shown in the drawings, envisions the extension of one side of the member 146 to a location proximate the reels 120 whereby the reels 120 are engaged and locked in place by the extended smde of the clip member 146.

The above descriptions of the video and audio tape cassette version of the present inventvon are meant to be illustrative in nature and are not intended to be solely limiting upon the scope and content of the following claims.

I claim:

1. A composite tape cassette for use with tape playback and record device comprising, in combination:

a rigid frame member defining the shape of such tape cassette for supporting the reels and tape, such tape and reels being retained between a pair of opposed support members, said support members being engaged together to define opposed side panels and a back panel, said side panels further defining a top edge along one support member and a bottom edge along said second support member and corner portions at the junctures between said side panels and said back panel, and tape gate in opposition to said back panel and extending between said two side panels, wherein said support members and back panel define a first thickness of rigid material and said corners, side members, top edge, bottom edge and tape gate define a second thickness of rigid material, said second thickness being greater than said first thickness; and a flexible sheath member bonded to said frame member to encompass said support members and back panel and abut said top and bottom edges, tape gate and corners and provide surfaces for the application of graphics directly onto such tape cassette.

2. The tape cassette of claim 1, wherein said rigid frame member is composed of a thermoplastic material.

3. The tape cassette of claim 1, wherein said flexible sheath member is of thickness that, when bonded to said first area of thickness of rigid material, provides a composite thickness of rigid material and sheath member substantially equivalent to said second thickness of rigid material, whereby said flexible sheath member is protected from premature wear.

4. The tape cassette of claim 1, wherein said support members each provide substantially one-half of said frame member and are retained in engagement by screws.

5. The tape cassette of claim 1, wherein said support members each provide substantially one-half of said frame member and are retained in engagement by means of a post and hole friction fit.

6. The tape cassette of claim 1 or 5, wherein the engagement of said support members is strengthened by the bonding of said sheath member to said first area of thickness.

7. The tape cassette of claim 1, wherein said first area of thickness includes an upraised bead sensitive to the application of ultrasound proximate the perimeter of said first area of thickness, wherein said upraised bead acts to bond said sheath member to said first area of thickness upon exposure to the ultrasound.

8. The tape cassette of claim 7, wherein said sheath member includes a coating of material on the surface intended to engage said frame member, said material coating acting to enhance the bond between said upraised bead and said sheath member when exposed to ultrasound.

9. The cassette of claim 1, wherein said sheath member is bonded to first area of thickness by an adhesive.

10. The cassette of claim 1, wherein said sheath member is bonded to said first area of thickness by hot melt glue.

11. The cassette of claim 1, wherein said sheath is composed of paperboard.

12. The cassette of claim 1, further including a clip member for attaching to said tape cassette proximate the tape gate of such cassette to protect such tape.

13. The cassette of claim 12, wherein said clip member includes a hub retainer member for engaging such reels of such cassette and locking such reels to prevent unwanted rotation.

14. The tape cassette of claim 1, wherein said first area of thickness provides a larger planar surface on each of said support members, said large planar surface extending between said side panels, said back panel and said tape gate.

15. The tape cassette of claim 14, wherein said large planar surfaces each include cut-out areas where such rigid material is removed and cross-members of such rigid material extend across said cut-out areas to retain and support such tape and reels.

16. The tape cassette of claim 1, wherein said flexible sheath member includes a material coating intended to provide a moisture vapor transmission barrier for said sheath member.

17. The tape cassette of claim 1, wherein said first area of thickness of rigid material is defined by said support members, back panel, side panels and top edge and said second and greater area of thickness of rigid material is defined by said corners, bottom edge, and tape gate.

* * * * *